I. J. VAN HUFFEL, Jr.
ADJUSTABLE WORK HOLDER.
APPLICATION FILED DEC. 10, 1906.
933,799.
Patented Sept. 14, 1909.
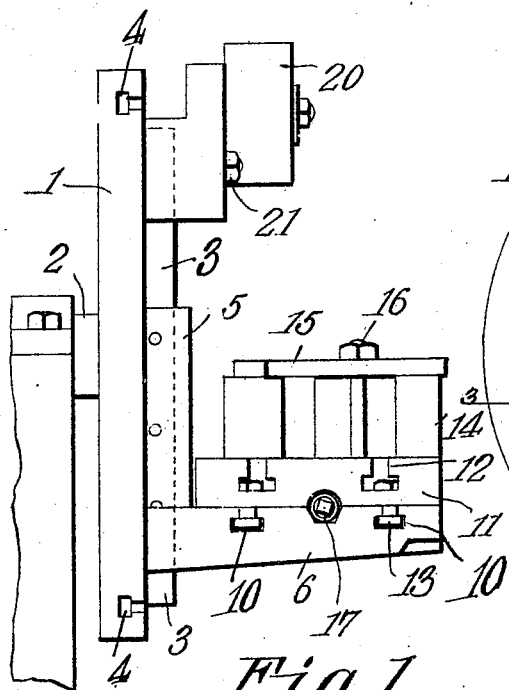
Fig. 1.
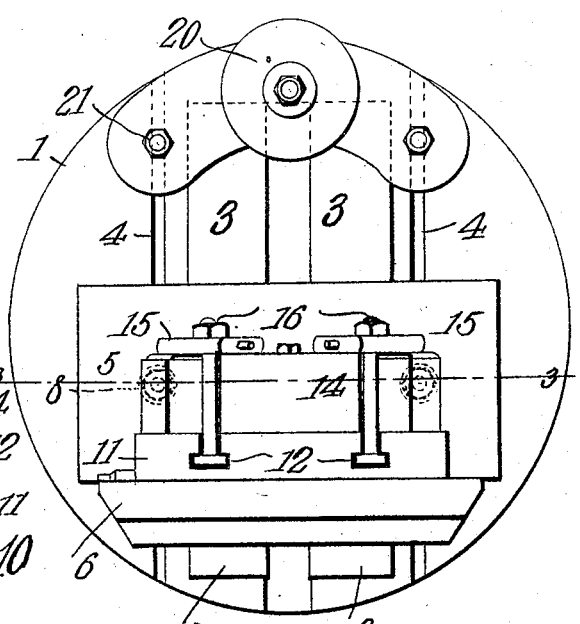
Fig. 2.
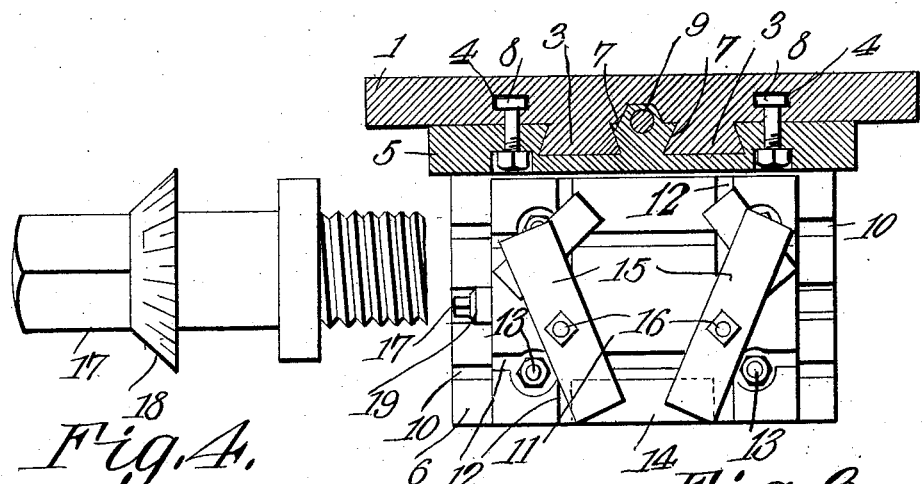
Fig. 4.
Fig. 3.
Isadore J. Van Huffel, Jr.,
INVENTOR.
WITNESSES:
By C. A. Snow & Co.
ATTORNEYS

UNITED STATES PATENT OFFICE.

ISADORE J. VAN HUFFEL, JR., OF MISHAWAKA, INDIANA.

ADJUSTABLE WORK-HOLDER.

933,799.

Specification of Letters Patent.   Patented Sept. 14, 1909.

Application filed December 10, 1906.  Serial No. 347,142.

*To all whom it may concern:*

Be it known that I, ISADORE J. VAN HUFFEL, Jr., a citizen of the United States, residing at Mishawaka, in the county of St. Joseph and State of Indiana, have invented a new and useful Adjustable Work-Holder, of which the following is a specification.

This invention has relation to adjustable work-holders for boring and similar machines and it consists in the novel construction and arrangement of its parts as hereinafter shown and described.

The object of the invention is to provide a work-holder which may be easily and readily adjusted to center the work with relation to a lathe or boring machine and which is so constructed as to properly retain the work in position. The holder consists primarily of a disk which may be attached to the shaft of a machine and which is provided with a vertically adjustable shelf. The shelf is provided with a plate upon which the work is supported and which may be moved laterally along the said shelf. Means for moving the shelf and the plate are also provided.

In the accompanying drawing:—Figure 1 is a side view of the work holder. Fig. 2 is a face view of the same. Fig. 3 is a sectional view of the same cut on the line 3—3 of Fig. 2, and Fig. 4 is a detail side elevation of the end of a shifting screw used upon the holder.

The holder comprises the disk 1 which is concentrically mounted upon the shaft of the machine tool 2. The disk 1 is provided upon its face with the elongated parallel tenons, 3, the vertical edges of which are beveled. Said tenons are arranged upon opposite sides of the diameter of the disk 1. The face of the disk 1 is also provided with the flanged grooves 4 which are located beyond the outer edges of the tenons 3 and which extend parallel with the said tenons.

Movably mounted on the tenons 3 is a slide 5 from the bottom of which a support or shelf 6 projects outwardly at a right angle thereto. The back of the slide 5 has mortises 7 in which the tenons 3 are dovetailed. Bolts 8, with their heads seated in the grooves 4, project through the slide 5 and carry nuts in depressions in the face of said slide to fasten it to the disk 1 as usual.

The screw 9 is journaled for rotation upon the disk 1 and engages a threaded perforation provided in the slide 5 said screw being located between the tenons 3, 3. The support or shelf 6 is provided with the transversely extending T-headed grooves 10 and the work supporting plate 11 rests upon the shelf 6 and is provided in its upper face with T-headed grooves 12. The bolts 13 pass through the plate 11 and have their heads located in the grooves 10. The work 14 is held upon the carrying plate 11 by the clamps 15 and bolts 16 in the usual manner. The screw 17 is journaled for rotation upon the shelf 6 and engages a threaded perforation provided in the plate 11. The screws 9 and 17 are provided at their heads with radially disposed graduations such as 18 which coöperate with marks 19 for the purpose of indicating the extent of rotation that each screw is subjected to. A counterbalance weight 20 is attached to the disk 1 by means of bolts 21, the heads of which lie in the grooves 4. The weight 20 may be adjusted independently of the back 5.

From the foregoing description it is obvious that the support or shelf 6 may be moved longitudinally of the tenons 3 by turning the screw 9 and that the work carrying plate 11 may be moved transversely upon the said shelf by the screw 17. Thus the work 14 may be positioned or centered with relation to the disk 1 and such positioning may be accurately and readily done without the use of hammers or mallets. It is further obvious that by reason of placing the support or shelf on the outer end of the slide, the work carrying plate can be moved by means of the screw 9 beyond the periphery of the disk 1 without becoming unsteady. Under certain conditions this extensive outward movement of the work is of great convenience and importance. Also, the counterbalance weight 20 may be so adjusted upon the disk 1 as to preserve the equilibrium of the device and the work and thus reduce wear upon the journals and bearings of the machine tool and vibration of the parts thereof.

Having described my invention what I claim as new and desire to secure by Letters-Patent is:—

A device of the class described comprising a disk having on one face spaced parallel tenons and formed in the said face with the under-cut groove located one beyond each of the tenons, and parallel thereto, a work-supporting shelf having mortises receiving the tenons whereby to permit of sliding adjustment of said shelf diametrically upon the face of the said disk, securing bolts having their heads seated in the grooves in the disk and extending through the said shelf member, nuts threaded upon the bolts whereby to hold the shelf at adjustment, and a counter-balance comprising a base plate, a weight carried by the plate intermediate of its ends, bolts passed through the plate at its ends and having their heads seating in the said grooves in the disk, and nuts threaded upon the said bolts whereby to permit of diametrical adjustment of the said counter-balance independently of the work-supporting shelf for the purpose of compensating for adjustment of the said shelf, the said base plate of the counter-balance bridging the tenons upon the disk.

In testimony that I claim the foregoing as my own, I have hereto affixed my signature in the presence of two witnesses.

ISADORE J. VAN HUFFEL, JR.

Witnesses:
ETHEL A. ANDERSON,
JOHN J. SCHINDLER.